Aug. 3, 1948. F. G. KERRY ET AL 2,446,511
OPEN-HEARTH STEELMAKING
Filed Aug. 21, 1947 4 Sheets—Sheet 3
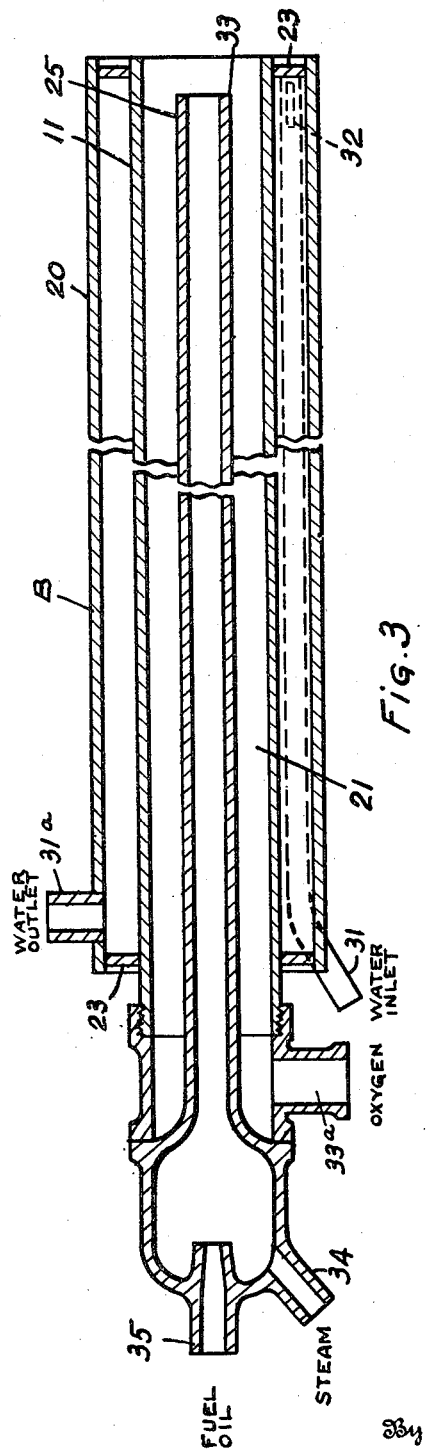
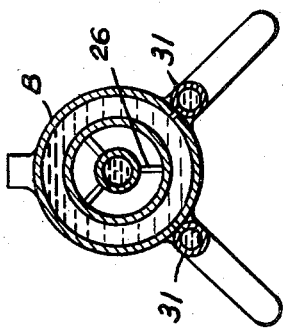
Inventors
FRANK G. KERRY
EDWARD T. W. BAILEY
By Alan Swabey
Attorney

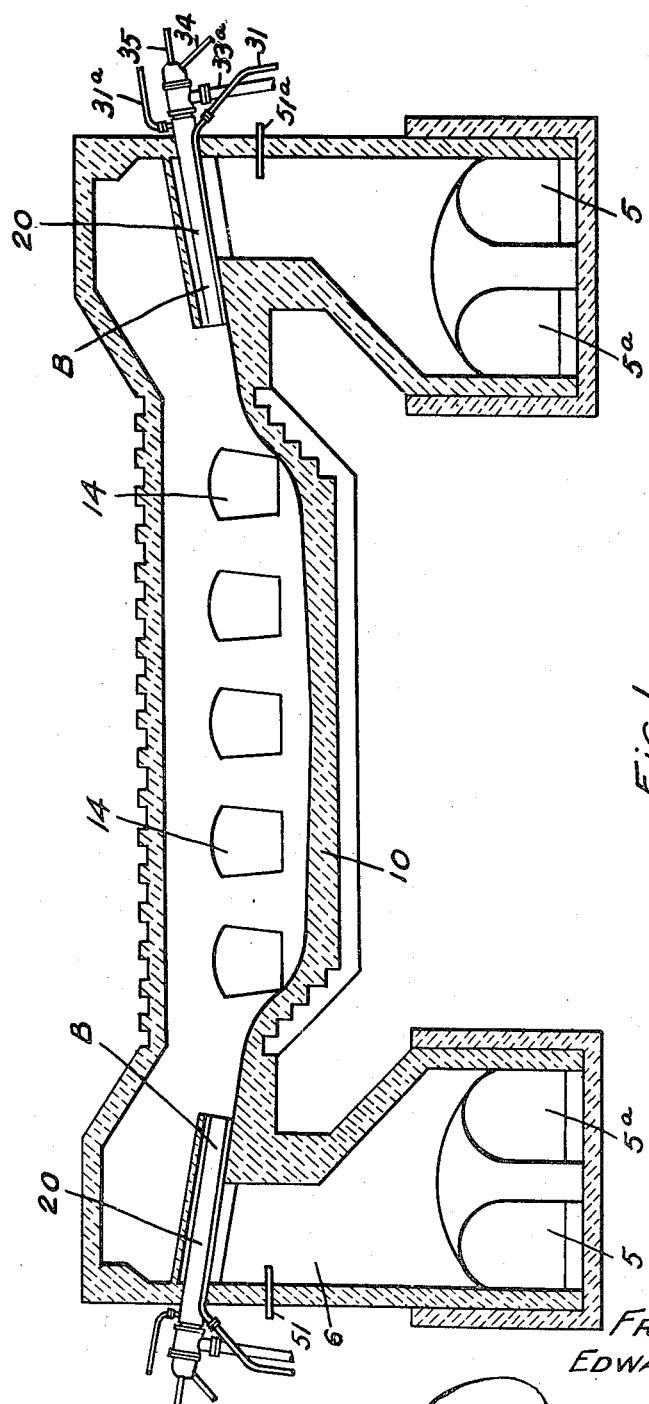

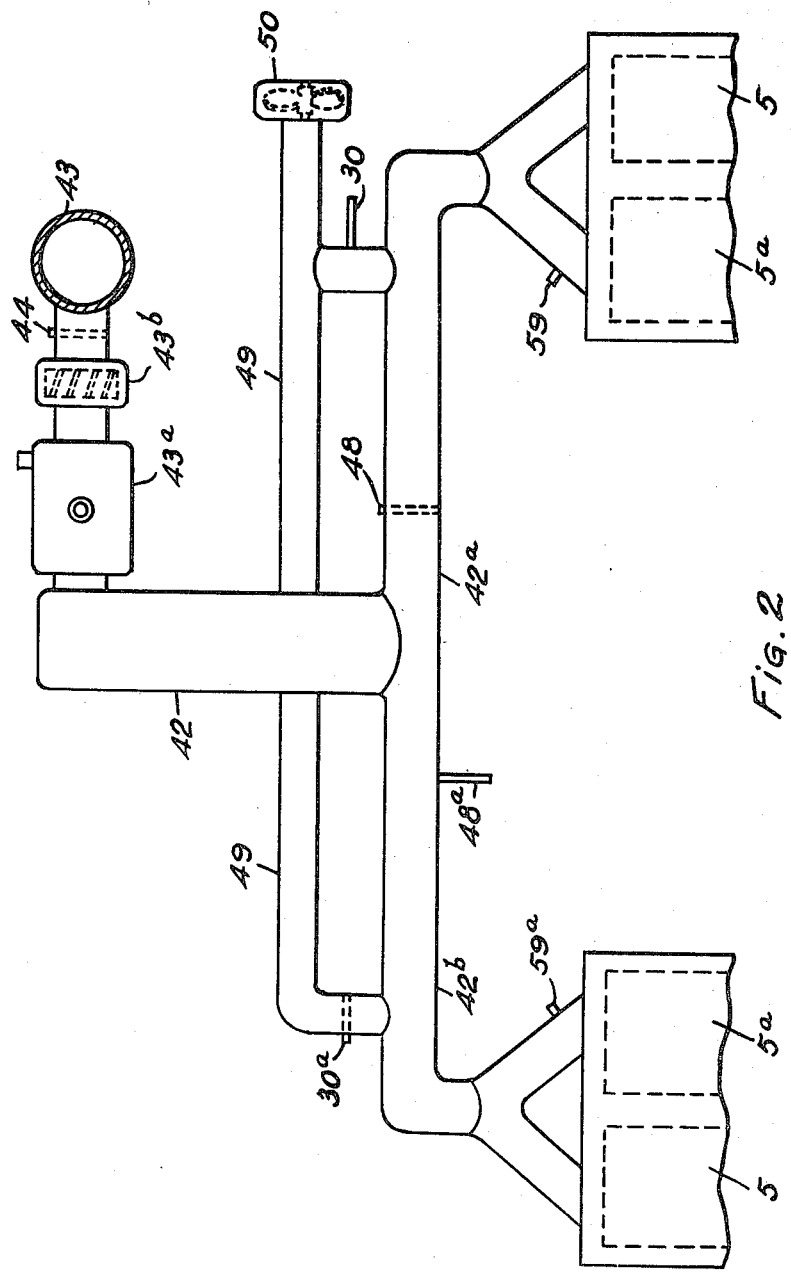

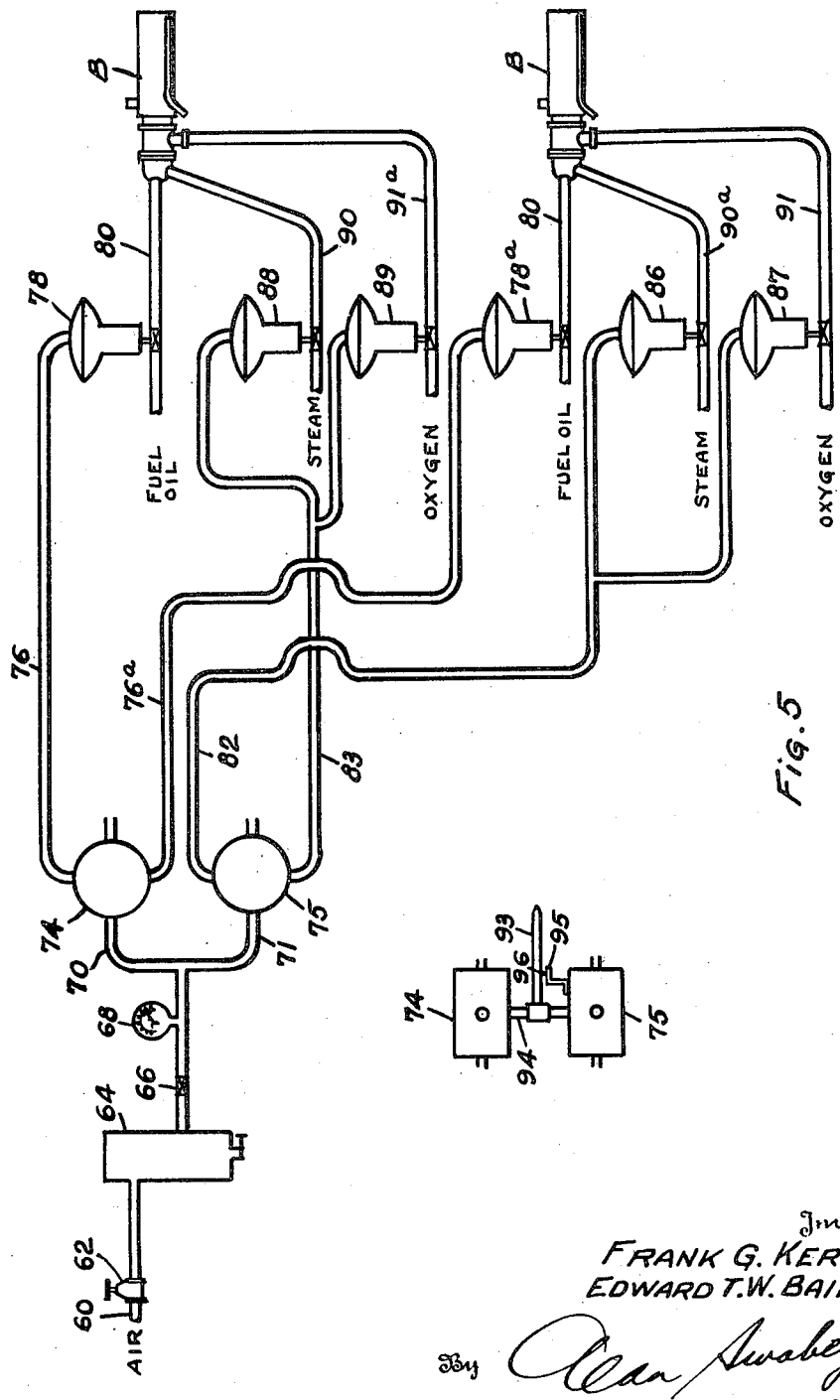

Patented Aug. 3, 1948

2,446,511

UNITED STATES PATENT OFFICE 2,446,511

OPEN-HEARTH STEELMAKING

Frank George Kerry, Montreal, Quebec, and Edward Thomas Walter Bailey, Hamilton, Ontario, Canada; said Kerry assignor to L'Air Liquide Societe Anonyme pour l'Etude et l'Exploitation des Procedes Georges Claude, Paris, France, a body corporate Application August 21, 1947, Serial No. 769,964
In Canada August 21, 1946

5 Claims. (Cl. 75—43)

INTRODUCTION

This invention relates to open-hearth steelmaking and this application is a continuation-in-part of applications 692,066 and 692,067 both filed August 21, 1946.

Open hearth steel-making is usually divided into two more or less distinct stages, the meltdown stage during which the scrap metal is melted by the heat of a flame projected in its vicinity and the refining stage in which the flame treatment of the charge is continued to refine the molten metal, after which the molten and refined metal is tapped.

One of the principal aims of the workers in this art has been to shorten the time necessary to complete the melting. Practically every conceivable expedient has been tried to accomplish this purpose, resulting in extensive and voluminous literature on the subject, to say nothing of the numerous "tours de main" of individual furnace operators which have never found their way into print. These prior art developments, while possibly affording their individual minor advantages, have not altered the fundamental economies of open-hearth furnace operation.

Among the expedients described for the purpose in question, has been the use of oxygen for enrichment of the global air fed for combustion so as to obtain more efficient combustion, though no attempts to put this proposal into practice appear to have been made. It has also been proposed that, in addition to the air required for combustion, free oxygen be introduced with the fuel to control the reducing qualities of the flame so as to regulate decarbonization of the heat of steel.

In normal open hearth practice, the limit to the amount of fuel fed to the furnace is the amount capable of substantially complete combustion in the furnace with the air which is introduced through the checkers. By "substantially complete combustion in the furnace" is meant combustion such that at the entrance to the outlet flue, i. e. the downtakes, there is at least a neutral and usually a mildly oxidizing atmosphere. Ordinarily, in order to ensure this result, air is fed at a rate considerably in excess of that which would theoretically be required to burn substantially completely the amount of fuel being fed and there has been no suggestion in the prior art effective to provide any considerable increase in the rate of fuel supply over that possible under such conditions.

APPLICANTS' PROCESS

We have now discovered that if oxygen in concentrated form (i. e. a gas containing not less than about sixty percent oxygen) is intimately brought together with the fuel as it enters the furnace and enough oxygen in dilute form (i. e. air or a gas containing oxygen in a concentration comparable to that in air) is supplied for effecting substantially complete combustion, then it is possible to burn substantially completely in the furnace not only a considerably greater amount of fuel than is ordinarily used but also a considerably greater amount than that which might be expected as a result of supplying part of the oxygen in concentrated form rather than in dilute form. The limit to the amount of fuel which can be substantially burnt, i. e. the limit to the fuel flow rate, now becomes the amount effective to provide substantially the maximum amount of flue gases resulting from such combustion that can concurrently be removed from the furnace.

According to the process of the present invention, the furnace is brought to operating temperature and oxygen in concentrated form and fuel are fed into the furnace during the melting down period and are intimately brought together as they enter the furnace to effect preliminary combining of the fuel and oxygen, i. e. hydroxylation. The amount of oxygen fed as concentrated oxygen is at least six and one-half cubic feet, namely about .55 pound (all volumetric measurements of gas in this specification are at sixty degrees Fahrenheit and a pressure of thirty inches of mercury) per pound (avoirdupois) of fuel fed. The amount of fuel is substantially greater than the amount of fuel (hereafter referred to as the "index" amount of fuel) which would produce, upon substantially complete combustion under meltdown conditions in the furnace proper with the amount of oxygen so fed and air, the same volume of flue gases per time unit as that obtained upon substantially complete combustion in the furnace with air alone of the maximum amount of fuel capable of such combustion with air alone while maintaining a neutral to mildly oxidizing atmosphere at the furnace exit, i. e. on entering the furnace downtakes. The remainder of the oxygen necessary for substantially complete combustion in the furnace of the fuel fed is introduced into the furnace in dilute form, preferably as air.

Preferably, the amount of concentrated oxygen is sufficient to hydroxylate the fuel substantially completely. Preferably, the amount of fuel is that effective to provide, upon substantially complete combustion in the furnace with the amount of oxygen so fed and air, substantially the maximum volume of flue gases that can be removed from the furnace. This amount of fuel may often be about forty-five percent or more greater than the index amount. At least about fifteen percent more fuel than the index amount should almost always be fed, since otherwise insufficient benefit is obtained to justify the use of the concentrated oxygen. Useful results may often be obtained with about twenty-five percent more fuel than the index amount.

The specific characteristics of the flame, particularly its length, volume, and temperature, may be varied by changing the ratio of oxygen to fuel so that the primary reaction may vary in degree of completion prior to complete combustion in the secondary oxygen. It is usually desirable to feed substantially the stoichiometric amount of oxygen to hydroxylate the fuel substantially completely prior to completion of the combustion in the secondary oxygen.

The flame formed as above described is concentrated directly upon the charge and as its envelope is much more restricted than that of an air-fuel flame, it hugs a concentrated region of the charge and its envelope is thus kept away from the refractory surface of the furnace. This condition, coupled with the fact that the increased fuel input substantially increases the calorific transfer results in a very rapid melting down of the charge with savings, for example, of from about twenty-five to about sixty percent in melt-down time not uncommon, the specific saving depending upon the scrap charge practice of the particular operator. Generally speaking, in characteristic heats in furnaces of standard design, a theoretical flame temperature is induced in the region of the charge between about 4500° F. and about 5000° F. The heat transfer takes place within a very concentrated region and is not transmitted as might be expected to the walls of the furnace, usually the temperature in the region of the walls of the furnace being maintained at not higher than about 3000° F. to about 3200° F., normally from 3000° F. to about 3100° F. in modern practice. In fact, the temperature adjacent the charge is elevated to a point normally destructive to the furnace, but the integrity of the furnace is maintained by concentration of the heat transfer as described.

The applicants have found that the high temperature oxygen flame treatment can, in most furnaces, be continued for the entire melt-down period, particularly where cold scrap is loaded fast to keep step with the more rapid melt-down occasioned by the oxygen-hydrocarbon flame so as to absorb the heat from the flame, but they prefer to refine the melted charge with a lower temperature flame resulting from the burning of the hydrocarbon fuels with a flame formed by the use alone of secondary oxygen in dilute form, desirably air. Moreover, they sometimes prefer during the latter part of the melt-down period to lower the oxygen concentration in the concentrated primary oxygen supply so as to propagate a flame which is not so sharp, as during the initial part of the melt-down.

APPARATUS

In order to carry out the present invention, the open hearth furnace is equipped with means for injecting the fuel and primary oxygen so that they will come into early intimate contact. This is preferably accomplished by a tubular burner at each end of the furnace, preferably with a central tube through which the liquid, gaseous or other fuel is injected into an annular surrounding passage through which the oxygen is injected. Where liquid hydrocarbon fuel is employed, the usual atomizing arrangement using steam or compressed air is also provided. The secondary oxygen is preferably introduced in the usual manner through the checkers. In order to carry out the present invention, control and reversing apparatus is employed, in conjunction with the furnace and the injection mechanism, whereby the fuel, concentrated oxygen, dilute oxygen, and the atomizing medium are alternately fed to one end of the furnace and then to the other.

DETAILED DESCRIPTION

In order to describe the invention more fully, reference will now be made to accompanying drawings illustrating one form of apparatus in which the invention may be carried out, and in which:

Figure 1 is a side elevation partly in section through a conventional type of open hearth furnace equipped for carrying out the present invention.

Figure 2 is a plan view of a portion of the furnace shown in Figure 1, illustrating particularly the secondary air supply and exhaust gas communications.

Figure 3 is an enlarged view of a portion of the furnace shown in Figures 1 and 2, illustrating in more detail the burner arrangement.

Figure 4 is a transverse cross-section through the burner shown in Figure 3.

Figure 5 is a diagrammatic view showing the arrangement for reversing the flow of fuel, primary and secondary oxygen, and the atomizing medium.

Referring more particularly to the drawings, the letters B indicate tubular type burners through which fuel and primary oxygen are admitted to the furnace proper. 5 and 5a indicate the checkers through which secondary air passes into the furnace through the ducts 6 which are then termed the uptakes. Alternately exhaust gases pass through the ducts 6, then termed the downtakes, from the furnace when the direction of flow is reversed by means of the mechanism shown in Figure 2. 10 is the hearth upon which the scrap is charged through charging doors 14. The "furnace proper" is designated as the portion between the respective burners B.

Each burner B includes a cylindrical casing 20 having an inner concentric oxygen tube 11, spaced from the casing to form a coolant jacket 22 closed at the ends by an annulus 23. In the center of the oxygen tube there is held by spiders 26 a longitudinal oil pipe 25. An oxygen passage is thus formed between the tube 11 and the pipe 25. This oil pipe may be slightly retracted as at 33 from the oxygen tube 11 so as to detach the flame from the fuel inlet.

A coolant fluid, usually water, is admitted at the rear of the burner, through the inlet and is charged through longitudinal spaced parallel pipes 31 welded to the casing 20 and extending from the front to the rear of the burner and underneath it. These pipes communicate with the jacket through radial elongated apertures 32 at the front of the burner. The water is discharged through a water outlet 31a. The primary oxygen tube, as well as the fuel oil and coolant pipes are connected to suitable sources of supply outside the furnace. The inlet to the oxygen tube 11 is denoted by 33a. Suitable means, as well known, is provided for atomizing the liquid fuel, where the fuel is a liquid hydrocarbon, steam being admitted through the pipe 34 and oil through the pipe 35.

The checker chambers 5 and 5a are connected by passages 42a and 42b with a common manifold 42. This manifold is in turn connected with a stack 43 through a boiler 43a and exhaust fan 43b. A stack damper 44 is arranged to control the draft through the stack. A pair of valves 48 and 48a are operable to control the flow of gases to the stack from one side of the manifold or the other and thus enable the furnace to be reversed. An air passage 49 leads to the passages 42a and 42b. For supplying air under a suitable pressure to the manifold and from thence to the fuel chambers in the furnace, there may be a fan or blower 50 of suitable type and capacity connected to the conduit 49 whose branches respectively communicate with the manifold on opposite sides of the valves 48, 48a, this communication being controlled by valves 30, 30a of suitable construction. Reversing mechanism may be manually controlled but is preferably operated by an automatic device which may be responsive to time, reversing the furnace say every 15 minutes, or responsive to temperature, say reversing when the temperature difference as indicated by the thermocouples 59 and 59a reaches a certain point.

In Figure 5 there is shown a reversing mechanism for insuring the supply of the flame forming media alternatively to the respective ends of the furnace. 60 is an air pressure line controlled by a valve 62. This line leads to a filter 64 and then through a reducing valve 66 past a meter 68 and branches into two portions 70 and 71. Each portion 70 and 71 leads to a 4-way air valve 74 and 75 respectively. From the valve 74 there lead airlines 76 and 76A respectively, each of which is connected to a diaphragm valve 78 and 78A, respectively. The latter each control the oil supply lines 80 and 80A respectively leading to the burner B at the respective ends of the open hearth furnace. From the 4-way valve 75 airlines 82 and 83 each lead to diaphragm valves 86, 87; 88, 89 respectively and the valves 86 and 88 control steam lines 90 and 90A to the respective burners and 87 and 89 oxygen lines 91 and 91A.

The valves 74 and 75 are operated in synchrony by a lever 93 which is connected with each valve through a shaft 94. A spring 95 and a catch 96 are adapted to hold the lever in neutral position. When the lever is in neutral position, both cylinders are open to air pressure. When the lever is moved 60° clockwise, No. 1 port, in the respective valves is opened to exhaust and No. 2 port left on full air pressure. When the lever is moved 60° counter-clockwise from neutral position, No. 2 port is connected with exhaust while No. 1 port is left on full air pressure. In this manner movement of the lever from one point to the other connects or disconnects the diaphragm valves with the air pressure supply.

It will be understood that the arrangements shown are preferred arrangements capable of carrying out the present invention and that various other arrangements may be employed within the scope of the inventive concept described, open hearth apparatus being capable of considerable modification. For example, while the invention has been described specifically in terms of atomized fuel oil, the apparatus may be modified, as will be understood by one skilled in the art, for burning other fuels having fluid characteristics, as for example fuel gas or powdered fuel. In some instances, it may even be desirable to burn more than one type of fuel at the same time, as for instance gas and oil.

OPERATION

In accordance with the invention and with the conditions above defined, fuel is admitted to the furnace through the inlet pipe 25 in one of the burners B, primary oxygen in concentrated form through the annular inlet passage 21, and secondary oxygen in dilute form is admitted through the checkers 5 and the passage 6. Atomizing steam is furnished through a supply pipe 34. Fuel is ignited at the burner inlet to form a flame and the primary oxygen supply is adjusted in accordance with the invention as above defined, to condition the fuel for substantially complete combustion in the secondary air.

Analysis of the flue gas will indicate the extent of the completion of combustion. This may be accomplinshed by sampling exhaust gases, for example as indicated by sampling tubes at 51 and 51a.

A cycle of operation is as follows. At the start of the operation, an ordinary flame with a relatively small amount of fuel is played on the hearth. The furnace is prepared for the charge by spreading of comminuted dolomite over the hearth of the furnace. Then, the proper amount of limestone or other lime-containing reagent is charged into the furnace and fed evenly on the bottom of the hearth to eventually act as a main refining agent. The flame is then directed on the charge to heat up the furnace and the oxygen propagated flame, as defined above, can be started immediately any charge is put in the furnace. The oxygen flame is at optimum conditions as described herein and the charging is continued until complete and the melt-down period carried on as described.

Since the highest temperatures are desirable at the outset in order to attain rapid heat transfer to cold scrap, it is usually desirable to feed a maximum supply of oxygen initially, i. e. sufficient to completely hydroxylate the fuel and to bring the fuel supply up to an amount effective to achieve the advantages of the present invention. It is necessary to load the scrap somewhat faster than the normal open hearth practice and this tends to absorb some of the increased heat output.

The furnace is operated by alternatively producing a flame at one end of the furnace and then reversing it and producing the flame from the other end. Reversal of the fuel, steam and oxygen is accomplished by manipulating the valves 74 and 75, e. g. by a temperature responsive device in the furnace, a timing device, or manually. The reversing period may be substantially standard depending upon gas temperatures and other considerations within the skill of the open hearth furnace operator.

As soon as the scrap becomes melted down, but is still at a lumpy stage, although with no high mounds, the applicants have found that it is sometimes desirable to cut down the oxygen or eliminate it. At the point when the metal becomes almost completely levelled, hot metal is often added.

It may also be desirable to employ flames formed in accordance with the present invention at different locations than the ends of the furnace, as for example, by projecting flames against the side of the charge from portable burners, etc., so as to obtain special melting effects. It may also be desirable to project flames against mounds of scrap from burners which are portable or conveniently located for this purpose.

It is difficult to define a sharp line of division between the melt-down period and the refining period, but the skilled furnace operator will observe the division between these two periods, usually lime boils begin to show, which indicates the beginning of the refining period. During the refining period, the normal type of flame is preferably employed.

It is understood, however, that the use of the oxygen accelerated flame according to the present invention need not necessarily be discontinued at the end of the melt-down period but can carry through into the refining period if the additional heat is required at that time, the criterion being that the use of this flame must be discontinued before the furnace reaches a critical destructive temperature as any skilled operator will recognize.

Actually, however, it is preferable to refine the charge by projecting upon it a flame created by burning fuel in secondary oxygen alone. Here, the criterion for governing the amount of fuel and oxygen feed is generally the flame length and preferably the maximum amount of fuel is fed which is capable of giving a neutral to mildly oxidizing atmosphere at the furnace exit. After refining, the charge is tapped.

EXAMPLE 1

In order to illustrate the invention in more detail, reference will be made by way of example to characteristic heats conducted in a conventional open hearth furnace.

The furnace employed tapped around 180 tons. The inside dimensions were 43 feet 6 inches by 15 feet 6 inches wide, by depth below the floor plate level of 30 inches. The area at the floor plate level amounted to 534.75 square feet. There were two checkers at each end having a length of 23 feet by 11 feet 6 inches width and 16 feet 1 inch width respectively. The mean depth of the checkers was 14 feet. The waste heat boiler of horizontal fuel tube design had a normal rating of 577 B. H. P. The furnace was equipped with fuel air ratio controls for both oil and gas, automatic reversal control by temperature difference, constant oil flow controller valve and recording flow meters for air, oil and gas. In addition, there was a modern furnace pressure control, actuating louver dampers at the outlet of the induced draft fan. A burner was employed substantially in accordance with the drawings herein. The oxygen was admitted into the regular gas passage and formed an annular ring around the oil burner pipe.

Two heats were conducted on the furnace in accordance with the following particulars and results:

Table 1

| Item | Heat A | Heat B |
|---|---|---|
| Total metallic charge, lbs | 396,430 | 415,165 |
| Percent hot metal | 41.9 | 43.5 |
| Charging time, hrs.-mins | 2-45 | 2-22 |
| Time to addition of hot metal, hrs.-mins | 3-18 | 3-09 |
| Melt time, hrs.-mins | 6-50 | 5-50 |
| Total time of heat, hrs.-mins | 8-10 | 9-05 |
| Tons produced | 179.10 | 188.95 |
| Yield, percent | 90.5 | 91.0 |
| Tons per hour (charge to tap) | 21.9 | 20.72 |
| Thousand B. t. u. per ton | 2,939 | 3,486 |
| Fuel as U. S. gal. oil/net ton (Bunker C) | 19.49 | 23.11 |
| Fuel as Imp. gal. oil/net ton | 16.23 | 19.25 |
| Fuel rate as oil, U. S. gal. per hour | 500 | 610 |
| Slag, actual FeO per cent | 9.8 | 6.0 |
| Rate of flow, oxygen cu. ft. per minute at start | 700 | 800 |
| Cu. ft. of oxygen used | 155,700 | 165,500 |
| Cu. ft. of oxygen used per net ton | 873 | 877 |

The average of three such heats as compared with heats using an oil air flame was as follows:

|  | Per cent |
|---|---|
| Reduction in time | 24 |
| Increase in tons per hour charged to tap | 36 |
| Reduction in fuel consumption per ton of steel tapped | 35 |

Spot tests indicate that on some furnaces the increase in output will exceed 40%. Generally speaking, the scrap melting time was shortened by at least 2½ hours.

EXAMPLE 2

The following are the details of a test using oxygen in the furnace and in the manner described in Example 1.

| 1. | 2. | 3. | 4. | 5. | 6. | 7a. | 7b. | 8 |
|---|---|---|---|---|---|---|---|---|
| E-W | 11.55 | 12.03 | (A) | 6.0 | ---- | ---- | ---- | ---- |
|  |  | 12.08 | ---- | ---- | ---- | ---- | ---- | ---- |
| W-E | 12.10 | 12.17 | 2010 | ---- | ---- | 66 | ---- | ---- |
|  |  | 12.22 | ---- | 3.0 | ---- | 66 | ---- | ---- |
| E-W | 12.25 | 12.27 | ---- | 4.0 | ---- | 68 | ---- | ---- |
|  |  | 12.31 | 1960 | ---- | ---- | ---- | 96 | .06 |
| W-E | 12.40 | 12.46 | 2130 | 2.4 | ---- | 68 | ---- | ---- |
| E-W | 12.55 | 1.01 | 2000 | ---- | ---- | 68 | ---- | .06 |
|  |  | 1.05 | ---- | 11.0 | ---- | 68 | ---- | ---- |
| W-E | 1.10 | 1.14 | ---- | 2.6 | ---- | 68 | ---- | .06 |
|  |  | 1.17 | 2060 | ---- | ---- | ---- | ---- | ---- |
| E-W | 1.25 | 1.31 | 2080 | 1.5 | ---- | 67 | 92 | ---- |
| W-E | 1.40 | 1.47 | 2210 | .0 | 0.2 | 67 | ---- | ---- |
| E-W | 1.55 | 2.05 | ---- | 2.0 | ---- | 68 | ---- | .06 |
| W-E | 2.10 | 2.20 | 2270 | 0.2 | 2.4 | 68 | 88 | ---- |
| E-W | 2.26 | 2.32 | 2140 | 1.0 | ---- | 67 | ---- | ---- |
| W-E | 2.41 | 2.48 | 2310 | 2.0 | ---- | 68 | ---- | ---- |
|  |  | 2.53 | (B) | ---- | ---- | 34 | ---- | ---- |
| E-W | 2.55 | 3.00 | 2170 | 1.5 | ---- | 31 | 90 | .06 |
| W-E | 3.12 | 3.20 | 2310 | 3.2 | ---- | ---- | ---- | ---- |
| E-W | 3.28 | 3.33 | 2190 (C) | 0.5 | ---- | 14 | ---- | .05 |
| W-E | 3.44 | 3.46 | 2500 | ---- | ---- | 13 | ---- | ---- |
|  |  | 3.55 | ---- | 0.9 | 0.2 | 14 | 94 | ---- |
|  |  | 4.00 | (D) | ---- | ---- | ---- | ---- | ---- |

LEGEND FOR THE ABOVE TABLE

1. Firing direction.
2. Reversing time.
3. Reading time.
4. Air temperature, °F.
5. Percent oxygen in flue gas.
6. Percent combustibles in flue gas.
7a. Oxygen at meter, p. s. i.
7b. Oxygen at meter temperature, °F.
8. Furnace pressure W. C.
(A) Oxygen turned on.
(B) Oxygen turned off to 600 cubic feet per minute.
(C) Oxygen cut to 400 cubic feet per minute.
(D) Oxygen turned off.

Discussion

In the tests, the following characteristics of the applicants' process were noted, as compared with fuel-air firing of the same open hearth furnace:

On the flame analyzer, the temperature of the flame obtained by the present method was fully 10 points on the average above normal flame readings (62). More fuel was burned in a given time. The fuel feed rate was considerably higher than possible when burning the fuel with air alone. The fuel fed per ton of metal charge was considerably less. Mounds of scrap were melted more rapidly. The amount of fuel was such that the flame, when using air alone for combustion, would have been excessively long and would have burned down at least into the down takes and possibly into the checkers. The flame was of higher heat value although it had a concentrated volume. The furnace was kept comparatively cool and yet a faster melting rate was obtained. The flame was direct, short, and controllable allowing the feeding of more fuel per unit of time. The radiation was lower. The flame could be manipulated so that its characteristics could be varied by regulating the proportion of primary concentrated oxygen. The preferred conditions are such that the primary concentrated oxygen and secondary dilute oxygen are co-ordinated so that the atmosphere on entering the down takes is substantially neutral to mildly oxidizing. The yield was increased. Charging was accelerated. The flame had a straighter trajectory than a fuel air flame. A substantially neutral flame is preferred in that the supply of secondary air and primary oxygen are co-ordinated to achieve substantially complete combustion of the fuel, with little excess oxygen passing into the down takes.

INDIVIDUAL FACTORS

Fuel

Various fuels may be used, with hydrocarbon fuels having fluid qualities, as for example liquid or gaseous, preferred. The applicants recommend the employment of liquid or gaseous hydrocarbons, by choice, heavy petroleum residues or coal tars, and fuel gases. The fuels are employed generally in accordance with the above directions.

It must be recognized, of course, that there are a number of conditions that set the specific fuel rate and that these conditions vary with each plant. In furnaces where a substantial amount of scrap is melted, it is desirable to apply as much heat input as possible, which, necessarily, means the highest possible rate of fuel injection. The limitation to the amount that can be burned has already been expressed. The range above the normal fuel rate (without oxygen) which can be expected for an average furnace can be as much as about 75% or more.

Where liquid fuel is used, it is preferably heated to render it fluid and then atomized either with steam or air before it is introduced into the furnace. By way of example, steam at from about 2 to about 6 pounds per U. S. gallon of oil and at from about 50 to about 250 pounds pressure per square inch may be employed to atomize the fuel. If air is used as the atomizing agent it is generally employed at concentrations within the range from about 7% to about 15% of total combustion air employed and at a pressure of from about 25 to about 100 p. s. i. g. The atomized liquid fuel at a temperature preferably from about 135° F. to about 210° F. is then injected into the furnace. The size of the burner tube fuel opening may vary considerably. Among suitable sizes are those ranging from about ½ inch to about 1 inch internal diameter.

Primary oxygen

As primary oxygen in concentrated form the applicants employ a gas containing at least about 60% oxygen, and preferably containing about 90% or more oxygen. Rapid improvement in the results is noted as the primary oxygen purity is increased, particularly in the lower purities. In terms of the theoretical amount of oxygen required for combustion, including a maximum of about 25% excess air, the primary oxygen range is approximately from 15% to 45% (by volume at 60° F. and 30 inches of mercury pressure). The size of the oxygen inlet preferably employed is from about the internal area of a standard 12" pipe to about the internal area of a standard 4" pipe, depending on the pressure available, etc. In any event, the feed must be such that sufficiently intimate contact may be had between the primary oxygen and the fuel for the oxygen to exercise its affinity for the carbon compounds to produce the desired primary reaction, believed to be the reaction known as "hydroxylation."

The hydroxylation reaction involves a rapid immediate break down of the hydrocarbon to complex oxygenated compounds and finally to elemental compounds or constituents which are burned in the surrounding atmosphere. These phenomena contrast with the less direct reaction, e. g. cracking, which is predominently the reaction which accompanies the burning of hydrocarbon fuel in air and which is thought to involve heat-absorbing reactions.

In the case of higher hydrocarbons where R represents a long chain hydrocarbon radical the mechanism of hydroxylation may be illustrated as follows:

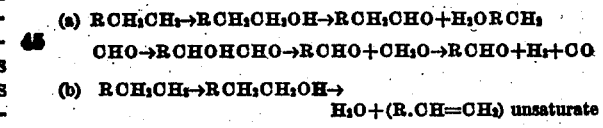

The hydroxylation reaction, followed by immediate combustion of the reaction products in the global air is characterized by a very short flame, a very high flame temperature, calculated theoretically to be from 4500° F. to 5000° F., the absence of free carbon in the flame as noted by the absence of carbon streaks in photographs, which streaks appear in a flame resulting from cracking and combustion of the fuel in atmospheric air.

The prerequisites for the reaction desired are a sufficiently high concentration of oxygen in the primary supply, a sufficiently rapid feed to keep up with the feed of hydrocarbon fuel, and proximity of the oxygen supply to the fuel stream. One way of contacting the oxygen with the fuel is illustrated in the drawings and is referred to in the description above. Here a hydrocarbon fuel jet and a surrounding fuel stream merge in a focal zone of low pressure just beyond the burner outlet and induce an immediate contacting or mixing or both, bringing about the rapid reaction prior to the eventual combustion of the reaction product in the global air. With liquid fuel the rate of flow is usually such that the oxygen is aspirated by the fuel.

Secondary atmosphere

The controlled secondary atmosphere is created as described by flowing oxygen in dilute form, for example atmospheric air or air slightly enriched for example up to about 27% oxygen content, through the checkers independently of the primary oxygen, preferably under forced draft and independently of the stack draft. In accordance with the principle of the invention above described, the atmospheric air employed will be coordinated with the supply of primary oxygen so as to provide sufficient total oxygen to burn the fuel substantially completely within the furnace proper and to provide a slight excess of oxygen in the flue gas. The applicants would like to operate as closely as possible to neutral and the theoretical low point is zero-oxygen zero-combustibles. With some furnaces it is possible to keep the flue gas analysis at about 2% oxygen, but it is not generally possible to hold an older furnace to this exact limit and satisfactory practice usually entails keeping the oxygen in the flue gas in slight excess, i. e. preferably less than about 5% with the furnace properly balanced and all doors closed. It is understood that when "substantially complete" combustion is referred to, this means "complete for all practical purposes." As is usual in open hearth practice, there may be traces of combustibles in the flue gas and the usual amounts of impurities. The practical index is the flue gas analysis as described. The secondary dilute oxygen is usually heated by passing it through the recuperators. The primary oxygen can also be heated, if desired, but is preferably fed at ambient temperatures.

The charge

The invention is applicable to the melting of charges which range from 100% down to about 20% cold scrap. The duration of the oxygen injection period is varied to meet the requirements of the charge. The invention is particularly applicable to the melting down of 100% cold scrap or charges high in cold scrap content where an intense high temperature flame is needed at the outset and a large heat transfer to the charge is desirable.

Coordination of factors

The above factors which have been discussed individually are coordinated as above described to bring about the desired result. For example, the fuel and primary oxygen flow rates are so adjusted that the governing factor to the amount of fuel is the volume of flue gases that can be removed from the furnace. Interdependently, the governing factor on the amount of primary oxygen is the flame characteristic desired, preferably the amount of oxygen being stoichiometrically that effective to hydroxylate the fuel substantially completely. The amount of secondary oxygen in dilute form is responsive to flue gas analysis. An over-riding factor is temperature towards the end of the melt-down period, since manipulation of the flame and the other factors must be governed by the fact that the temperature adjacent the refractories must be kept down below a certain maximum. There are a number of variables which alter the specific conditions for an individual furnace, such as the specific type of fuel, the kind and size of the furnace auxiliaries such as forced and induced draft fans, size and height of the stack, the age of the furnace, the size of the flues, the nature of the refractories, the nature of the charge, i. e. amount and analysis of hot metal, and many other conditions of practice which vary with each plant.

Distinctions—advantages

The applicants' method contrasts with prior art practice in that, while it was well recognized that the more fuel burnt the better, the limit to the amount which could be burned was the ability to burn the fuel substantially completely in the furnace proper before the flame extended out through the furnace exit. No attempt was made to coordinate the primary supply of concentrated oxygen with a secondary supply of global dilute oxygen and to increase the fuel supply considerably, even though suggestions had been made to supply oxygen either to enrich the secondary air or to supply oxygen in addition to that necessary for combustion so as to form an oxidizing flame. The applicants prefer to operate so that the flue gases contain not more than about 5% oxygen.

For the purposes of obtaining the flue gas analyses so as to maintain a neutral to mildly oxidizing atmosphere at the downtakes, the applicants prefer to sample the exit gas at about floor level in the downtakes.

The aim is to maintain a neutral to mildly oxidizing condition of the gases just before they enter the downtakes. It is also preferable to sample the gases on the tapping side of the furnace.

In accordance with the present invention, the conditions are so changed by the use of oxygen that the limit to the amount of fuel is no longer the length of the flame, but is the capacity for removing waste gases from the furnace. This, in practice, is all the fuel a particular furnace can burn without forcing the contained gases into the surrounding atmosphere, for example through cracks and door openings. It is usually desirable to operate close to this maximum fuel feed but in any event, the fuel feed is always substantially greater as above defined, than according to prior art practice. In accordance with the invention the ratio of oxygen to air is governed to some extent by economic considerations and it is generally desirable to provide enough oxygen in a manner described to hydroxylate the primary fuel substantially completely prior to secondary combustion. On the other hand, less oxygen can be employed and no matter what amount is used in the primary reaction an advantage is gained over prior art practice in that the amount of fuel which is fed under such conditions, in accordance with the invention, is greater than the amount which can be fed according to the prior art using a fuel-air flame.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

We claim:

1. A process of making steel in an open hearth furnace which comprises melting down a charge in an open hearth with a flame formed by feeding fuel into the furnace during the melting-down with oxygen containing gas containing not less than about 60% oxygen; intimately bringing together said oxygen containing gas and fuel as they enter the furnace, thereby to accelerate the primary reaction of combustion; the amount of oxygen so fed being at least about 15% of the total oxygen required for substantially complete combustion in the furnace of the fuel so fed, and being at least about .55 pound per pound of fuel so fed; introducing into the furnace oxygen in dilute form to provide the remainder of the oxygen necessary for substantially complete combustion in the furnace of the fuel so fed; the amount of fuel fed being between an amount which is about 15% greater than the amount of fuel which would be completely combusted in the furnace in the presence of the oxygen so fed and produce the same volume of flue gas as would be produced when the maximum amount of fuel is completely combusted in the furnace in air alone and an amount to provide substantially the maximum amount of flue gases that can concurrently be removed from the furnace; and impinging the flame so formed directly upon the charge to effect its melting down thereby accelerating the melting down of the charge whereby the meltdown time is substantially less than possible with a fuel-air flame.

2. A process according to claim 1 wherein the oxygen containing gas contains oxygen in amount not less than about 90%.

3. A process according to claim 1 wherein the fuel is fed at a rate to provide substantially the maximum amount of flue gases resulting from combustion that can concurrently be removed from the furnace.

4. A process according to claim 1 wherein the oxygen in dilute form introduced into the furnace as the remainder of the oxygen necessary for substantially complete combustion is atmospheric air.

5. A process according to claim 1 wherein the oxygen containing gas contains oxygen in amount not less than about 90% and wherein the oxygen in dilute form introduced into the furnace as the remainder of the oxygen necessary for substantially complete combustion is atmospheric air.

FRANK GEORGE KERRY.
EDWARD THOMAS WALTER BAILEY.

REFERENCES CITED

The following references are of record in the file of this patent:

UNITED STATES PATENTS

| Number | Name | Date |
| --- | --- | --- |
| 1,545,823 | Feild | July 14, 1925 |
| 1,588,634 | Wallstrom | June 15, 1926 |
| 1,659,869 | Gow | Feb. 21, 1928 |
| 1,718,732 | Danforth | June 25, 1929 |
| 1,792,021 | Loftus | Feb. 10, 1931 |
| 1,812,563 | Simpson | June 30, 1931 |
| 1,955,589 | Leahy | Apr. 17, 1934 |
| 1,983,927 | Bent | Dec. 11, 1934 |
| 2,039,087 | Kinzel | Apr. 28, 1936 |
| 2,182,498 | Longenecker | Dec. 5, 1939 |
| 2,362,085 | Morgan | Nov. 7, 1944 |